UNITED STATES PATENT OFFICE.

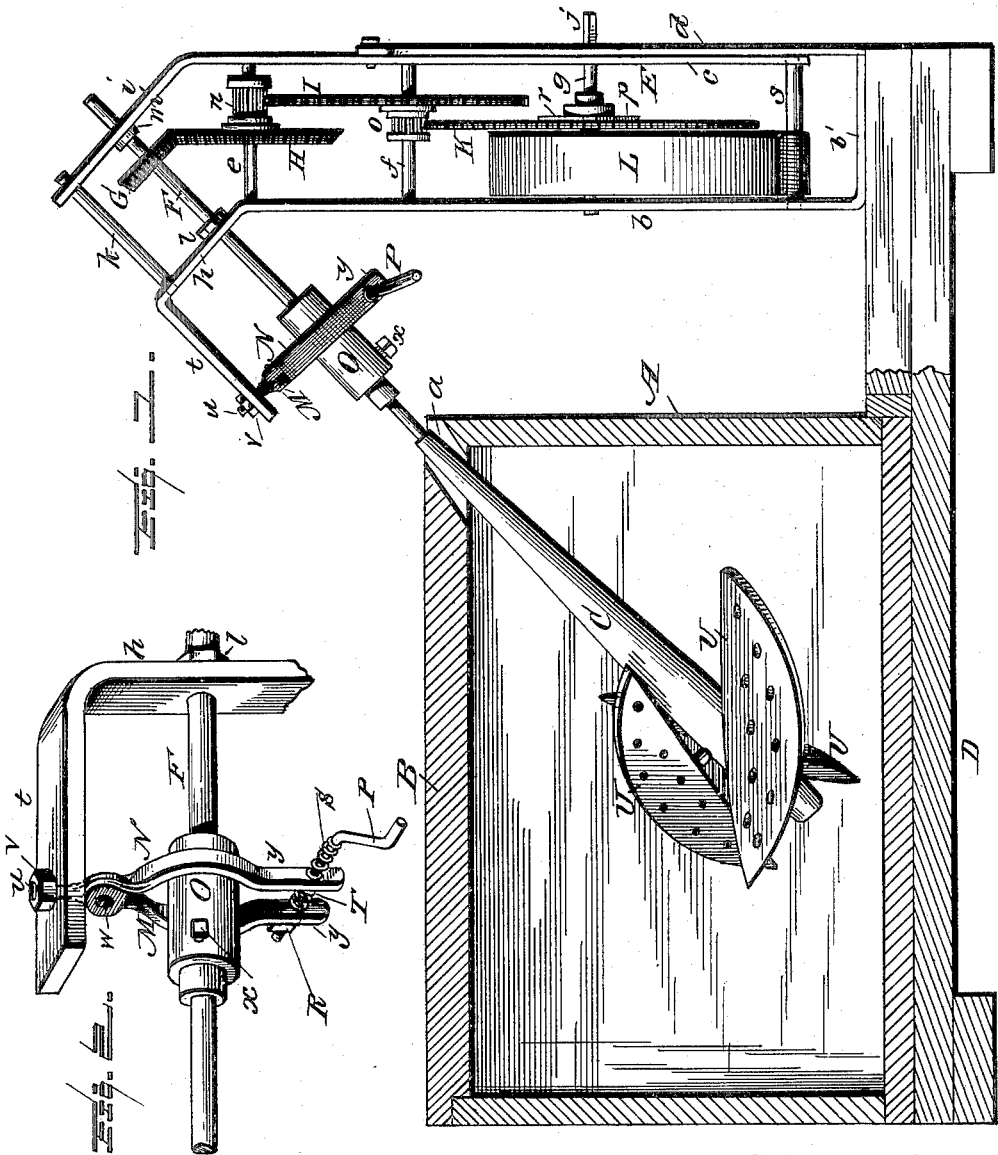

WILLIAM A. JOHNSTON AND EVERTT I. McDONALD, OF BUCKLAND, OHIO.

CHURN.

SPECIFICATION forming part of Letters Patent No. 660,112, dated October 23, 1900.

Application filed April 26, 1900. Serial No. 14,426. (No model.)

*To all whom it may concern:*

Be it known that we, WILLIAM A. JOHNSTON and EVERTT I. McDONALD, citizens of the United States, residing at Buckland, in the county of Auglaize and State of Ohio, have invented certain new and useful Improvements in Churns; and we do hereby declare that the following is a full, clear, and exact description of the same, reference being had to the annexed drawings, making a part of this specification, and to the letters of reference marked thereon.

The present invention has for its object to provide a simple and effective churn in which the speed of the dasher-shaft may be regulated and the cream thoroughly agitated; and it consists in a churn constructed substantially as shown in the drawings and hereinafter described and claimed.

Figure 1 of the drawings is a side elevation of a churn constructed in accordance with our invention, showing the box or vessel in section. Fig. 2 is a detail view in perspective and on an enlarged scale of the governor and its connecting parts.

In the accompanying drawings, A represents the box or vessel for containing the cream to be churned, said box being square or having straight sides to break the current of the cream when acted upon by the rotary motion of the dasher, the square corners of the box or vessel serving to break the current and give increased agitation to the cream.

The box or vessel A is provided with a suitable removable cover B, which has an inclined opening $a$ to receive the inclined dasher-shaft C, said dasher-shaft and also the box or vessel and the cover thereof being constructed of wood, so that the cream will not be brought in contact with any metallic substance and so as to prevent corrosion and discoloration of the cream.

The box or vessel A rests upon a suitable support D, of any preferred construction, to which support is connected a suitable driving mechanism for the dasher-shaft.

There is shown one of many forms of driving power that may be conveniently employed for the purpose of giving to the dasher-shaft the required rotary motion, which consists in the present instance of a suitable frame E, secured to the support D. The frame E consists of the two metal standards $b$ $c$ and the braces $d$, which braces are connected to the standard $c$ and to the support D, there being only one of said braces shown in the drawings. The two standards $b$ $c$ form supports and bearings for the rotatable shafts $e\ f\ g$, the upper ends of the standards being bent at an obtuse angle to form bearing extensions $h$ $i$ for the inclined spindle F of the dasher-shaft C, which extensions are connected by a brace $k$. The standard $b$ has a footpiece $b'$. Spindle F has rigidly secured thereto the two collars $l$ $m$ to hold the shaft in position in engagement with the two bearing extensions $h$ $i$ and is provided with the bevel gear-wheel G. This bevel gear-wheel G meshes with the teeth of a similar but larger gear-wheel H upon the shaft $e$, which shaft is provided with a suitable pinion $n$, with which engages the gear-wheel I upon the shaft $f$. This shaft $f$ has a suitable pinion $o$, with which engages the large driving gear-wheel K upon the shaft $g$, said shaft having the usual ratchet-wheel $p$ and pawl $r$. To the shaft $g$ is rigidly secured one end of a coiled spring L, the opposite end of the spring being attached to the brace-rod $s$, said shaft having a flat-sided extension $j$ for engaging a winding-crank to rotate the shaft and wind up the spring.

The above arrangement of gearing and spring do not differ materially from the ordinary form of spring-motor, and we therefore do not wish to be understood as limiting our invention to the special construction of motor shown, as it may be variously modified or changed in the several details of construction without departing from the essential features of the invention, any of the usual forms of spring-motors being substituted therefor.

Any suitable train of gears connecting with the spindle of the dasher-shaft and a spring-power for operating the gears and transferring the motion to the spindle may be substituted for the spring and gearing shown.

The standard $b$ at its upper end after extending at an obtuse angle to form the bearing extension $h$ extends again at a right angle to the extension $h$ to form a hanger $t$ for connecting thereto the two clamping-arms M N. The clamping-arms are segmental in form, the clamping-arm M having a screw-threaded shank $u$, which extends up through a hole in the hanger $t$ and secured thereto by a nut $v$, engaging with the screw-threaded end of the shank, the clamping-arm N being pivoted at $w$ to the clamping-arm M. These clamping-arms are segmental in form, so as to embrace the coupling O, which may be of any suitable form and construction that will securely connect the two sections of the spindle F. The upper one of the sections of the spindle F is permanently secured to the coupling O, while the lower section of the spindle is detachably connected to the coupling by means of the set-screw $x$, so that the dasher-shaft C may be disconnected and removed from the box or vessel A when desired.

The segmental clamping-arms M N have extensions $y$, through which passes a crank-rod P, having screw-threads on its end to receive a regulating-nut R. The screw-threaded part of the crank-rod P works in the extension $y$ of the pivoted clamping-arm N, while its inner end extends freely through the extension $y$ of the fixed clamping-arm M and is secured by the regulating-nut R. The pivoted clamping-arm N is therefore readily adjustable toward and from the fixed clamping-arm M, according to the direction in which the crank-rod is turned. Coiled springs S T are placed upon the crank-rod P, the spring S upon the outside of the extension $y$ of the arm N and between it and the crank end of the rod P, while the spring T is disposed between the extensions $y$ of the two arms M N, as shown in Fig. 2 of the drawings, to regulate the speed of the dasher-shaft by frictional contact of the clamping-arms with the coupling of the sectional spindle. In turning the crank-rod P in the proper direction the two friction-arms M N will be brought in frictional contact with the surface of the coupling O and create the desired frictional resistance to regulate the rotation of the dasher-shaft. The springs S T even up the pressure of the friction or clamping arms M N upon the coupling O, rendering the arm N spring-actuated and preventing binding of the arms.

It will be noticed that the dasher-shaft is entirely within the churn box or vessel, its support being outside, and the shaft being of wood no metal comes in contact with the cream.

The shaft C is conical in shape, having its greatest diameter at a point where the dasher-blades U are connected, thereby giving increased strength and rendering the shaft more effective. These blades U are segmental in shape and are preferably perforated and arranged at an acute angle with each other to give greater effect as agitators when coming in contact with the cream.

The friction-arms are considered of material importance in that they control the movement of the dasher, the spring S pressing against the arm N, which arm being loose by its pivotal connection with the arm M the arm N will be pressed against the coupling O. The spring T being located between the two arms M N serves to press them apart when the nut R is unscrewed or turned in a direction to admit of the arm N being forced outward by the spring T from contact with the coupling, thereby leaving the coupling to rotate freely when found necessary.

The two springs S T pressing in an opposite direction, or against each other, serve to even up the pressure upon the coupling O, and when the churn-dasher is removed the gearing is prevented from running by tightening up the arms against the coupling, so as to hold it against turning.

The spring, with its system of gearing, is the ordinary form of spring-motor, no claim being laid thereto, and therefore any suitable and well-known form of motor or any suitable driving power may be substituted therefor, the motor herein described having for its purpose to show one of many means that may be employed for rotating the dasher-shaft, and thereby present a complete churn with its shaft-driving mechanism. The frame E, however, which comprises the standards $b$ $c$, is of special construction to adapt it for supporting the dasher-shaft in an inclined position, as well as to support the two depending segmental friction-arms M N and also to support the system of gearing of whatever driving power that may be employed for rotating the dasher-shaft.

Having now fully described our invention, what we claim as new, and desire to secure by Letters Patent, is—

1. The combination of an inner standard formed with an obtuse-angle part at its upper end, an outer standard formed with an obtuse-angle part at its upper end, a brace for the outer standard, the lower brace-rod for the standards, the upper brace-rod for the obtuse-angle parts of the standards, the spindle journaled in the obtuse-angle parts, having supporting-collars and carrying a bevel gear-wheel located between the obtuse-angle parts, the lower winding-shaft carrying a gear-wheel, a spring connected with the lower brace-rod and with the lower winding-shaft, the intermediate shaft carrying a pinion and gear-wheel, and the upper shaft carrying a pinion and bevel gear-wheel.

2. The combination of an inner standard formed with an obtuse-angle part at its upper end, having a right-angle part, an outer standard formed with an obtuse-angle part at its upper end, a spindle journaled in the obtuse-angle parts, means for operating the spindle, the fixed clamping-arm having an extension and a screw-threaded shank, a nut whereby the screw-threaded shank is locked to the right-angle part, the movable clamping-arm having an extension and pivoted to the fixed clamping-arm, the screw-threaded crank-rod, extending through the extensions of the clamping-arms beneath the spindle-coupling, a nut for locking the crank-rod to the extension of the fixed clamping-arm, a spring coiled around the crank-rod between the extensions of the clamping-arms, and a spring coiled around the crank-rod between the extension of the movable clamping-rod and the crank end of the crank-rod.

3. The combination of an inner standard formed with an obtuse-angle part at its upper end having a right-angle part, an outer standard formed with an obtuse-angle part at its upper end, a brace for the outer standard, the lower brace-rod for the standards, the upper brace-rod for the obtuse-angle parts of the standards, the spindle, journaled in the obtuse-angle parts having supporting-collars and carrying a bevel gear-wheel located between the obtuse-angle parts, the spindle-coupling, the lower winding-shaft carrying a gear-wheel, a spring connected with the lower brace-rod and with the lower winding-shaft, the intermediate shaft carrying a pinion and gear-wheel, the upper shaft carrying a pinion and bevel gear-wheel, the fixed clamping-arm having an extension and a screw-threaded shank, a nut whereby the screw-threaded shank is located to the right-angle part, the movable clamping-arm having an extension and pivoted to the fixed clamping-arm, the screw-threaded crank-rod extending through the extensions of the clamping-arms beneath the spindle-coupling, a nut for locking the crank-rod to the extension of the fixed clamping-arm, a spring coiled around the crank-rod between the extensions, a spring coiled around the extension of the movable clamping-arm and the crank end of the crank-rod.

In testimony that we claim the above we have hereunto subscribed our names in the presence of two witnesses.

WILLIAM A. JOHNSTON.
EVERTT I. McDONALD.

Witnesses:
JACOB F. BROREIN,
THOS. McLAUGHLIN.